(12) United States Patent
Takimoto

(10) Patent No.: US 8,770,852 B2
(45) Date of Patent: Jul. 8, 2014

(54) WHEEL BEARING DEVICE

(71) Applicant: JTEKT Corporation, Osaka (JP)

(72) Inventor: Masao Takimoto, Kashiwara (JP)

(73) Assignee: JTEKT Corporation, Osaka-shi (JP)

( * ) Notice: Subject to any disclaimer, the term of this patent is extended or adjusted under 35 U.S.C. 154(b) by 0 days.

(21) Appl. No.: 13/652,711

(22) Filed: Oct. 16, 2012

(65) Prior Publication Data

US 2013/0108201 A1    May 2, 2013

(30) Foreign Application Priority Data

Oct. 27, 2011  (JP) .................. 2011-236158

(51) Int. Cl.
*F16C 19/28*    (2006.01)
(52) U.S. Cl.
USPC .......................................... 384/548
(58) Field of Classification Search
USPC .................. 384/564, 569, 571, 589
See application file for complete search history.

(56) References Cited

U.S. PATENT DOCUMENTS

| | | | |
|---|---|---|---|
| 5,822,860 A | 10/1998 | Wadsworth-Dubbert et al. | |
| 6,715,926 B2* | 4/2004 | Tajima et al. | 384/544 |
| 2003/0012474 A1 | 1/2003 | Tajima et al. | |
| 2007/0031079 A1* | 2/2007 | Komori et al. | 384/589 |
| 2010/0021102 A1 | 1/2010 | Fukumura et al. | |
| 2010/0215302 A1* | 8/2010 | Torii et al. | 384/490 |
| 2010/0239202 A1* | 9/2010 | Kuroda et al. | 384/512 |

FOREIGN PATENT DOCUMENTS

| | | |
|---|---|---|
| EP | 1 277 597 A1 | 1/2003 |
| EP | 2 103 450 A1 | 9/2009 |
| JP | A-2006-064146 | 3/2006 |

OTHER PUBLICATIONS

Mar. 4, 2013 Extended European Search Report issued in European Patent Application No. EP 12 18 8992.

* cited by examiner

*Primary Examiner* — Alan B Waits
*Assistant Examiner* — Brian McGovern
(74) *Attorney, Agent, or Firm* — Oliff PLC

(57) ABSTRACT

A wheel bearing device includes an inner shaft and an inner ring member fitted onto an outer periphery of an axially-inner end portion of the inner shaft. A shaft portion coupled to the inner shaft so as to be rotatable together with the inner shaft is inserted in a center hole of the inner shaft. Spline grooves spline-fitted to spline teeth formed on an outer periphery of the shaft portion are formed in an inner periphery of the inner shaft, which defines the center hole. An annular clearance that suppresses reduction in a diameter of the inner shaft due to fitting of the inner ring member onto the inner shaft is formed between the inner ring member and the axially-inner end portion of the inner shaft, within a range where an axial range in which the spline teeth are formed overlaps with an axial range of the inner ring member.

3 Claims, 4 Drawing Sheets

WHEEL BEARING DEVICE

INCORPORATION BY REFERENCE

The disclosure of Japanese Patent Application No. 2011-236158 filed on Oct. 27, 2011 including the specification, drawings and abstract, is incorporated herein by reference in its entirety.

BACKGROUND OF THE INVENTION

1. Field of the Invention

The invention relates to a wheel bearing device.

2. Description of Related Art

Usually, a drive shaft for transmitting torque from a power source is coupled to a bearing device that supports a drive wheel of a vehicle, such as an automobile. FIG. 4 is a sectional view that shows an example of a conventional wheel bearing device for supporting a drive wheel. A wheel bearing device 100 includes a cylindrical inner shaft 101, an outer ring 103, and an inner ring member 104. A flange 101a, to which a wheel is fitted, is formed at one end portion of the inner shaft 101. The outer ring 103 is arranged radially outward of the inner shaft 101 via double-row tapered rollers 102. The inner ring member 104 is fitted to the outer periphery of the other end portion of the inner shaft 101. A shaft portion 106 (drive shaft) is inserted into the inner shaft 101 to be arranged radially inward of the inner shaft 101. The shaft portion 106 is formed to protrude from the distal end of a constant velocity joint 105. A plurality of spline teeth 108 is formed on the outer periphery of the shaft portion 106. The spline teeth 108 are spline-fitted to spline grooves 107 formed in the inner periphery of the inner shaft 101. In addition, a nut 109 is screwed to one end portion of the shaft portion 106. The inner shaft 101 is fastened between the nut 109 and the constant velocity joint 105. In this way, the shaft portion 106 and the inner shaft 101 are coupled to each other so as to be rotatable together with each other (see, for example, Japanese Patent Application Publication No. 2006-64146 (JP 2006-64146 A)).

In the wheel bearing device 100, the inner ring member 104 is fitted to the outer periphery of the other end portion of the inner shaft 101, so the other end portion of the inner shaft 101 are deformed such that the diameter thereof is reduced. Accordingly, the spline grooves 107 formed in the inner periphery of the inner shaft 101 are also deformed such that the diameter of the inner periphery of the inner shaft 101 is reduced. This may hinder insertion of the shaft portion 106 into the inner shaft 101.

If the axial length, or the like, of the inner ring member 104 is adjusted, it is possible to reduce deformation of the other end portion of the inner shaft 101. However, adjusting the axial length of the inner ring member 104 requires a change in the size, or the like, of each tapered roller. This may lead to a decrease in the performance of the bearing device. Therefore, from a viewpoint of maintaining the original performance of the wheel bearing device, adjusting the axial length, or the like, of the inner ring member 104 is not preferable.

Therefore, the spline grooves 107 are formed in the inner periphery of the inner shaft 101 as follows. First, the inner periphery of the inner shaft 101, to which the inner ring member 104 has not been fitted, is subjected to broaching. In this way, the spline grooves 107 having predetermined dimensions are formed. After that, the wheel bearing device 100 is assembled, and the inner ring member 104 is fitted to the outer periphery of the other end portion of the inner shaft 101. Then, the inner periphery of the inner shaft 101 is subjected to broaching again, and then subjected to finishing such that the spline grooves 107 have predetermined dimensions. Therefore, even if the inner shaft 101 is deformed such that the diameter thereof is reduced through the fitting of the inner ring member 104 to the inner shaft 101, the dimensions of the spline grooves 107 of the inner shaft 101 are adjusted into the predetermined dimensions through the finishing. In this way, it is possible to prevent occurrence of a situation where the shaft portion 106 cannot be spline-fitted to the inner shaft 101.

However, in the above-described wheel bearing device, the inner shaft 101 is subjected to broaching twice. Therefore, a large number of man-hours are required to manufacture the wheel bearing device. On the other hand, if broaching on the inner shaft 101 alone is omitted and spline grooves 107 are formed in the inner periphery of the inner shaft 101 only by performing broaching on the inner shaft 101 to which the inner ring member 104 has been fitted, it is possible to reduce man-hours for broaching. However, in this case, after the wheel bearing device 100 is assembled, spline grooves 107 are formed by machining once, so a large amount of cutting chips are produced. The produced cutting chips may adhere to the tapered rollers and raceways of the bearing device and foreign matter may enter the wheel bearing device 100. Therefore, it is not preferable to form spline grooves 107 by performing broaching only once after the wheel bearing device 100 is assembled and the inner ring member 104 is fitted to the outer periphery of the inner shaft 101. Rather than forming the spline grooves 107 in this way, it is more preferable to finish forming the spline grooves 107 by performing broaching on the inner shaft 101 before assembly of the wheel bearing device 100.

SUMMARY OF THE INVENTION

It is an object of the invention to provide a wheel bearing device that makes it possible to prevent occurrence of a situation where a drive shaft cannot be spline-fitted to an inner periphery of an inner shaft, without performing finishing after the assembly of the wheel bearing device, while maintaining the original performance of the wheel bearing device.

An aspect of the invention relates to a wheel bearing device, including: a cylindrical inner shaft that has one end portion to which a wheel is fitted; an outer ring that is arranged radially outward of the inner shaft so as to be concentric with the inner shaft with double-row rolling elements interposed between the outer ring and the inner shaft; and an inner ring member that has an outer periphery having a raceway for the rolling elements in one of the rows, which is located axially inward of the other one of the rows, and that is fitted to an outer periphery of the other end portion of the inner shaft. An inner periphery of the inner shaft, which defines a center hole, has spline grooves that are respectively spline-fitted to a plurality of spline teeth formed on an outer periphery of a drive shaft that is inserted into the center hole of the inner shaft. An annular clearance is formed between the inner ring member and the other end portion of the inner shaft, within a range where an axial range in which the spline teeth of the drive shaft are formed overlaps with an axial range of the inner ring member.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
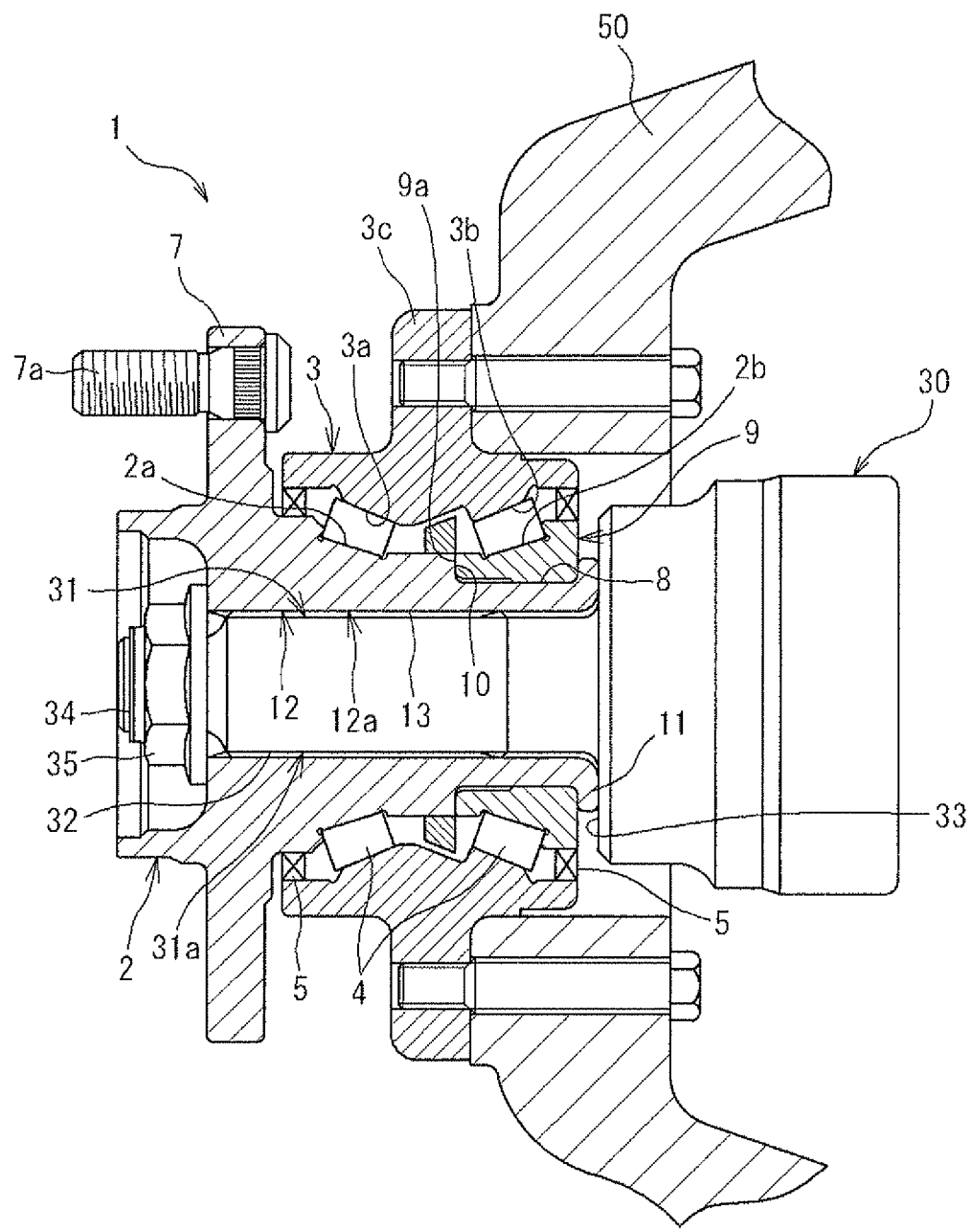
FIG. 1 is a sectional view of a wheel bearing device according to an embodiment of the invention.

An example embodiment of the invention will be described with reference to the accompanying drawings. FIG. 1 is a sectional view of a wheel bearing device 1 according to the embodiment of the invention. The wheel bearing device 1 is used as a bearing device that supports a drive wheel of a vehicle, such as an automobile, such that the drive wheel is rotatable. The wheel bearing device 1 is fixed to a knuckle 50 on an inboard side of the wheel bearing device 1. The knuckle 50 is a member extending from the vehicle body side.

The wheel bearing device 1 constitutes a double-row tapered roller bearing. The wheel bearing device 1 includes an inner shaft 2, an outer ring 3, a plurality of tapered rollers 4 that serve as rolling elements, seal members 5, and cages (not shown). A wheel (not shown) is fitted to one end portion of the inner shaft 2 on an outboard side of the wheel bearing device 1. The outer ring 3 is arranged radially outward of the inner shaft 2 so as to be concentric with the inner shaft 2. The tapered rollers 4 are arranged between the inner shaft 2 and the outer ring 3. The seal members 5 seal an annular clearance between the inner shaft 2 and the outer ring 3. The cages retain the respective two rows of tapered rollers 4 in the circumferential direction.

The outer ring 3 is a fixed ring that is fixed to a vehicle-body side member, and a first outer ring raceway 3a and a second outer ring raceway 3b are formed on the inner periphery of the outer ring 3. The tapered rollers 4 roll on the first and second outer ring raceways 3a, 3b. In addition, a fitting flange 3c is formed on the outer periphery of the outer ring 3. The fitting flange 3c is used to fit the outer ring 3 to the knuckle 50 that is a vehicle body-side member.

The inner shaft 2 is a cylindrical member that extends along the axial direction. The inner shaft 2 is an axle to which the drive shaft is fitted, and constitutes a rotary ring of the wheel rolling bearing device 1. A flange 7 is formed at the one end portion of the inner shaft 2. A plurality of hub bolts 7a is fixed to the flange 7, and the wheel is fitted to the flange 7. In addition, a first inner ring raceway 2a is formed on the outer periphery of the inner shaft 2. The first inner ring raceway 2a faces the first outer ring raceway 3a. A small-diameter portion 8 is formed at the other end portion of the inner shaft 2. The small-diameter portion 8 is smaller in diameter than the outer periphery of the inner shaft 2. An annular inner ring member 9 is fitted to the small-diameter portion 8. A second inner ring raceway 2b is formed on the outer periphery of the inner ring member 9. The second inner ring raceway 2b faces the second outer ring raceway 3b. The inner ring member 9 is press-fitted to the small-diameter portion 8 with an end face 9a of the inner ring member 9 in contact with a step face 10 that connects the outer periphery of the inner shaft 2 to the small-diameter portion 8. By press-fitting the inner ring member 9 onto the small-diameter portion 8 and forming a clinched portion 11 at an end of the small-diameter portion 8, the inner ring member 9 is fixed in the axial direction. The clinched portion 11 is formed on the opposite side of the small-diameter portion 8 from the step face 10.

The tapered rollers 4 are rollably arranged between the first inner ring raceway 2a and the first outer ring raceway 3a and between the second inner ring raceway 2b, which is located axially inward of the first inner ring raceway 2a, and the second outer ring raceway 3b. These tapered rollers 4 are arranged in two rows.

In addition, a shaft portion 31 that serves as a drive shaft is inserted in a center hole 12 of the inner shaft 2. The shaft portion 31 is provided at a constant velocity joint 30 that is coupled to a vehicle body-side drive shaft (not shown). A plurality of spline teeth 32 is formed on an outer periphery 31a of the shaft portion 31. In addition, spline grooves 13 are formed in an inner periphery 12a of the inner shaft 2, which defines the center hole 12. The spline teeth 32 of the shaft portion 31 are spline-fitted to the spline grooves 13. By spline-fitting the spline teeth 32 to the spline grooves 13, the shaft portion 31 and the inner shaft 2 are coupled to each other so as to be rotatable together with each other.

The shaft portion 31 of the constant velocity joint 30 is inserted into the center hole 12 until a body portion end face 33 of the constant velocity joint 30 contacts the clinched portion 11. In this way, the constant velocity joint 30 is positioned with respect to the wheel bearing device 1 in the axial direction. A thread portion 34 is formed at the distal end portion of the shaft portion 31. By screwing a nut 35 to the screw thread portion 34, the inner shaft 2 is fastened between the nut 35 and the constant velocity joint 30. In this way, the inner shaft 2 and the constant velocity joint 30 are coupled to each other.

Figure 2:
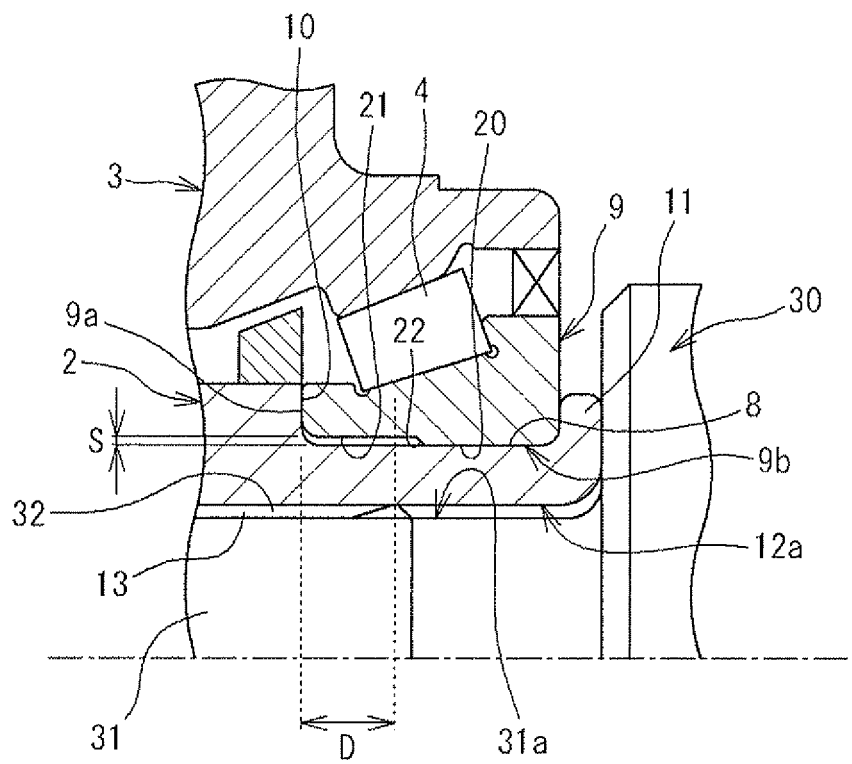
FIG. 2 is an enlarged sectional view of a main portion of the wheel bearing device in FIG. 1.

FIG. 2 is an enlarged sectional view of a main portion in FIG. 1. The spline teeth 32 formed on the shaft portion 31 extend to such a position that the spline teeth 32 axially overlap with the small-diameter portion 8 when the wheel bearing device 1 and the constant velocity joint 30 are coupled to each other. Accordingly, the spline grooves 13 formed in the inner shaft 2 extend to such a position that the spline grooves 13 axially overlap with the small-diameter portion 8 when the wheel bearing device 1 and the constant velocity joint 30 are coupled to each other.

In addition, a small-diameter surface 20 and a large-diameter surface 21 are formed on an inner periphery 9b of the inner ring member 9. The small-diameter surface 20 is in contact with the small-diameter portion 8. The large-diameter surface 21 is an increased diameter portion that is formed to be larger in diameter than the small-diameter surface 20. The large-diameter surface 21 extends from the end face 9a axially inward to a step portion 22 that is contiguous with the small-diameter surface 20. An annular clearance S is formed between the large-diameter surface 21 and the outer periphery of the small-diameter portion 8 of the inner shaft 2. The annular clearance S is set to have a radial width of 0.1 to 0.5 mm. The large-diameter surface 21 that defines the annular clearance S is formed so as to include a range D in which, when the constant velocity joint 30 is coupled to the wheel bearing device 1 and the shaft portion 31 is inserted in the inner shaft 2, an axial range in which the spline teeth 32 are formed on the shaft portion 31 overlaps with an axial range of the inner periphery 9b of the inner ring member 9. Therefore, the annular clearance S is also formed to include the range D.

The annular clearance S is formed between the inner ring member 9 and the small-diameter portion 8 formed at the other end portion of the inner shaft 2. Thus, if the inner ring member 9 is fitted onto the inner shaft 2, the inner ring member 9 restrains the outer periphery of the inner shaft 2 within the range of the small-diameter surface 20 that contacts the inner shaft 2, but does not restrain the outer periphery of the inner shaft 2 within the range in which the annular clearance S is formed. Therefore, within the range in which the annular clearance S is formed, it is possible to suppress shrinkage deformation of the inner shaft 2.

In the thus configured wheel bearing device 1, the annular clearance S, which suppresses shrinkage deformation of the inner shaft 2 that would occur when the inner ring member 9 is fitted onto the inner shaft 2, is formed between the inner ring member 9 and the inner shaft 2, within the range D where the axial range, in which the spline teeth 32 are formed, overlaps with the axial range of the inner ring member 9. Thus, even when the inner ring member 9 is fitted onto the inner shaft 2, shrinkage deformation of the spline grooves 13 formed in the inner periphery of the inner shaft 2 is suppressed at least within the range in which the spline teeth 32 of the shaft portion 31 are formed. As a result, it is possible to prevent occurrence of a situation where the shaft portion 31 and the inner shaft 2 cannot be spline-fitted to each other.

By forming the annular clearance S, it is possible to prevent a situation where the shaft portion 31 and the inner shaft 2 cannot be spline-fitted to each other. Therefore, it is no longer necessary to change the dimensions of various portions of the bearing device, so it is possible to maintain the original performance of the wheel bearing device. As described above, according to the present embodiment, it is possible to prevent occurrence of a situation where the shaft portion 31 cannot be spline-fitted to the inner shaft 2, even if finishing is not performed after the wheel bearing device is assembled, while maintaining the original performance of the wheel bearing device.

In addition, in the above-described embodiment, the annular clearance S is formed between the large-diameter surface 21 formed on the inner periphery 9b of the inner ring member 9 and the outer periphery of the small-diameter portion 8 of the inner shaft 2. Therefore, it is not necessary to subject the inner shaft 2 to a process for forming the annular clearance S. Thus, it is possible to form the annular clearance S while eliminating factors that reduce the strength of the inner shaft 2.

Note that the invention is not limited to the above-described embodiment. In the above-described embodiment, the annular clearance S is formed between the large-diameter surface 21 formed on the inner periphery 9b of the inner ring member 9 and the outer periphery of the small-diameter portion 8 of the inner shaft 2. However, when the inner shaft 2 and the inner ring member 9 have such dimensions that no problem occurs in terms of strength even if a process of forming an annular clearance in the inner shaft 2 is performed, a step may be formed in the small-diameter portion 8 of the inner shaft 2 and an annular clearance S is formed between the small-diameter portion 8 and the inner periphery of the inner ring member 9.

Figure 3:
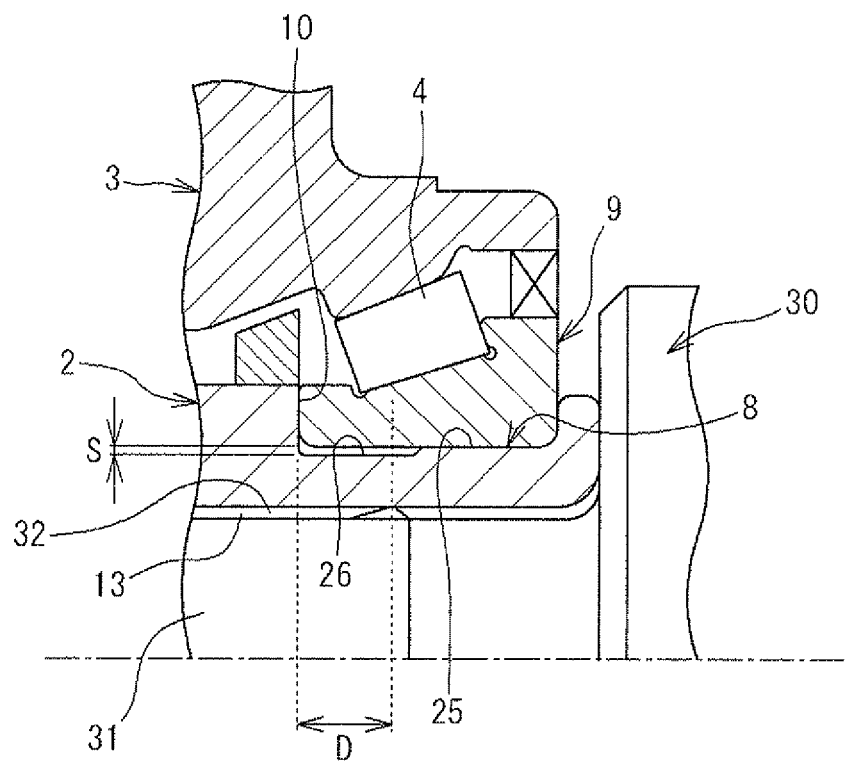
FIG. 3 is an enlarged sectional view of a main portion of a wheel bearing device according to an alternative embodiment of the invention.
Figure 4:
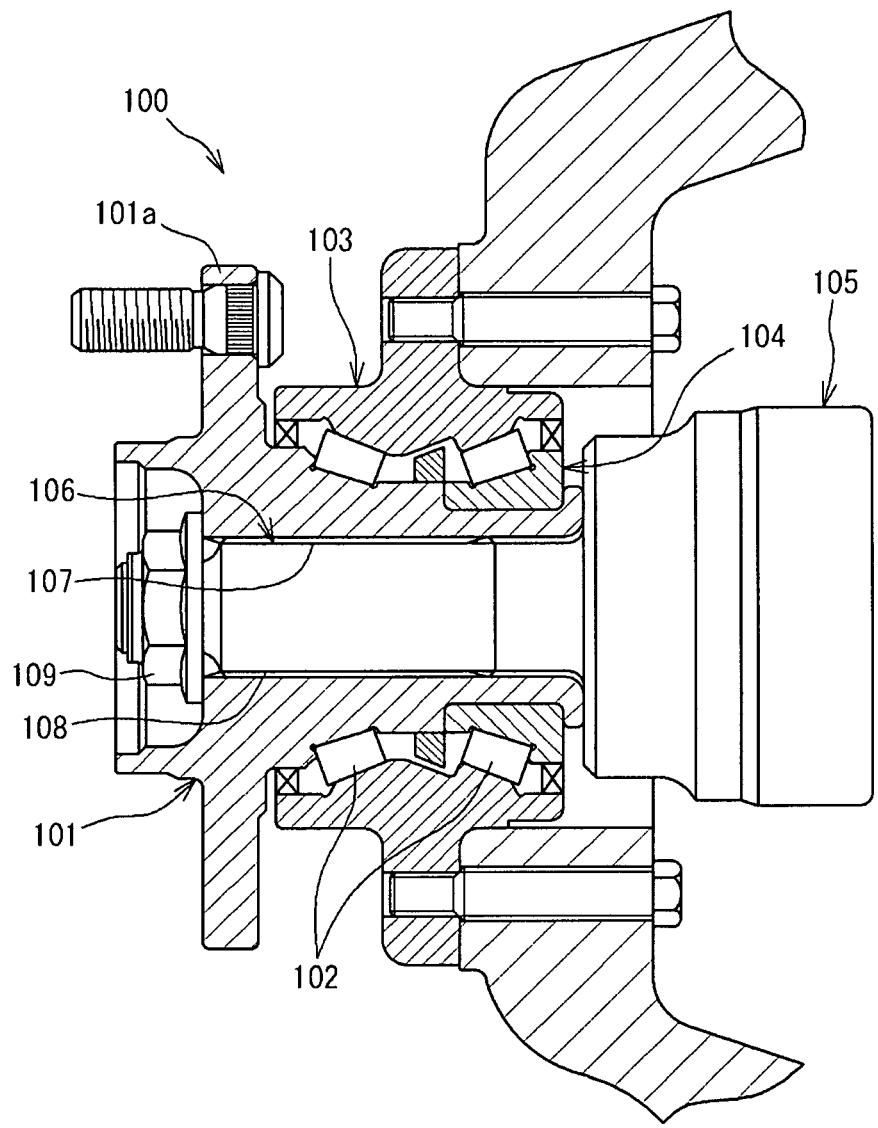
FIG. 4 is a sectional view of a conventional wheel bearing device.

For example, as shown in FIG. 3, when a large-diameter surface 25 and a small-diameter surface 26, which serves as a reduced diameter portion that is smaller in diameter than the large-diameter surface 25, are formed on the small-diameter portion 8 of the inner shaft 2, it is possible to form the annular clearance S between the small-diameter surface 26 and the inner periphery of the inner ring member 9.

In addition, in the above-described embodiment, the annular clearance S is formed in a cylindrical shape. However, the annular clearance S may be formed in any shape as long as shrinkage deformation of the inner shaft 2 due to fitting of the inner ring member 9 on the inner shaft 2 is suppressed. For example, the large-diameter surface 21 or the small-diameter surface 26 may be a tapered surface or may be in a polygonal shape instead of an annular shape in axial front view. Furthermore, in the above-described embodiment, the invention is applied to the wheel bearing device 1 that constitutes a double-row tapered roller bearing. Alternatively, the invention may be applied to, for example, a bearing device that constitutes a double-row angular contact ball bearing.

According to the invention, it is possible to prevent occurrence of a situation where the drive shaft cannot be spline-fitted to the inner periphery of the inner shaft, without performing finishing after the assembly of the wheel bearing device, while maintaining the original performance of the wheel bearing device.

What is claimed is:

1. A wheel bearing device, comprising:
   a cylindrical inner shaft that has a first end portion to which a wheel is fitted on an outboard side;
   an inboard side disposed axially opposite from the outboard side;
   an outer ring that is arranged radially outward of the inner shaft so as to be concentric with the inner shaft with double-row rolling elements interposed between the outer ring and the inner shaft; and
   an inner ring member that has an outer periphery having a raceway for the rolling elements in one of the rows, which is located axially inward of the other one of the rows, and that is fitted to an outer periphery of a second end portion of the inner shaft, located opposite to the first end portion, wherein
   an inner periphery of the inner shaft, which defines a center hole, has spline grooves that are respectively spline-fitted to a plurality of spline teeth formed on an outer periphery of a drive shaft that is inserted into the center hole of the inner shaft;
   an annular clearance is formed between the inner ring member and the second end portion of the inner shaft from an outboard side end face of the inner ring member in an axial direction to an axial end point that does not reach an inboard side end face of the inner ring member; and
   the spline teeth of the drive shaft extend from the outboard side to the inboard side to overlap an axial range of the annular clearance and do not reach the axial end point of the annular clearance.

2. The wheel bearing device according to claim 1, wherein the annular clearance is formed between an increased diameter portion formed in an inner periphery of the inner ring member and the outer periphery of the second end portion of the inner shaft.

3. The wheel bearing device according to claim 1, wherein the annular clearance is formed between a reduced diameter portion formed in the outer periphery of the second end portion of the inner shaft and an inner periphery of the inner ring member.

* * * * *